United States Patent
Mochizuki et al.

(10) Patent No.: US 11,110,569 B2
(45) Date of Patent: Sep. 7, 2021

(54) BONDING JIG

(71) Applicant: TOYOTA JIDOSHA KABUSHIKI KAISHA, Toyota (JP)

(72) Inventors: Michihisa Mochizuki, Toyota (JP); Katsuhiko Kinoshita, Nisshin (JP); Junji Kuhara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/403,686

(22) Filed: May 6, 2019

(65) Prior Publication Data
US 2019/0344405 A1 Nov. 14, 2019

(30) Foreign Application Priority Data
May 14, 2018 (JP) .............................. JP2018-092776

(51) Int. Cl.
*B25B 11/00* (2006.01)
*H01M 50/403* (2021.01)
*H01M 8/0254* (2016.01)
*H01M 8/0234* (2016.01)

(52) U.S. Cl.
CPC ......... *B25B 11/005* (2013.01); *H01M 50/403* (2021.01); *H01M 8/0234* (2013.01); *H01M 8/0254* (2013.01)

(58) Field of Classification Search
CPC .............................. B25B 11/005; H01M 2/145
See application file for complete search history.

(56) References Cited

U.S. PATENT DOCUMENTS

| | | | | | |
|---|---|---|---|---|---|
| 3,627,338 A | * | 12/1971 | Thompson | ............ | B25B 11/005 279/3 |
| 3,652,075 A | * | 3/1972 | Thompson | ............ | B25B 11/005 269/21 |
| 5,753,070 A | * | 5/1998 | Dandia | ............... | H01L 21/6715 156/382 |

(Continued)

FOREIGN PATENT DOCUMENTS

| JP | 2005-273354 A | 10/2005 |
|---|---|---|
| JP | 2016-143468 A | 8/2016 |

OTHER PUBLICATIONS http://www.2linc.com/vacuum_chuck_top_plate_8x12.htm (Year: 2015).*

*Primary Examiner* — Leith S Shafi
*Assistant Examiner* — Nicholas R Krasnow
(74) *Attorney, Agent, or Firm* — Sughrue Mion, PLLC

(57) ABSTRACT

A bonding jig used for bonding a gas diffusion layer or a fuel cell constituent member including the gas diffusion layer to be sandwiched between separators and an adhesive sheet for joining the separators to the gas diffusion layer or fuel cell constituent member, the bonding jig being capable of simultaneously performing bonding and eliminating fluffy fibers on the gas diffusion layer. The bonding jig includes a loading area (recess) where the gas diffusion layer is loaded when the bonding is performed, and the recess has a plurality of communication holes that communicate with the outside and that are coupled to a suction pump. While the adhesive sheet is placed on the side of the upper face of the bonding jig so as to be integrated with the gas diffusion layer, the suction pump is actuated to eliminate fluffy fibers on the gas diffusion layer.

9 Claims, 6 Drawing Sheets

(56) References Cited

U.S. PATENT DOCUMENTS

| | | | | |
|---|---|---|---|---|
| 5,857,667 | A | * | 1/1999 | Lee ................. B25B 11/005 |
| | | | | 269/21 |
| 8,854,790 | B1 | * | 10/2014 | Hsieh ................ H01L 21/6831 |
| | | | | 361/234 |
| 9,287,806 | B2 | * | 3/2016 | Park ..................... H02N 13/00 |
| 2003/0051443 | A1 | * | 3/2003 | Kodai ................ B29C 51/421 |
| | | | | 53/453 |
| 2003/0128308 | A1 | * | 7/2003 | Kim ..................... G02F 1/1333 |
| | | | | 349/58 |
| 2007/0223173 | A1 | * | 9/2007 | Fujisawa ............. H02N 13/00 |
| | | | | 361/234 |
| 2007/0268476 | A1 | * | 11/2007 | Phillips ................ G03F 7/707 |
| | | | | 355/75 |
| 2009/0067114 | A1 | * | 3/2009 | Balan ................ H01L 21/6838 |
| | | | | 361/234 |
| 2010/0007054 | A1 | * | 1/2010 | Tseng ............. B29C 45/14262 |
| | | | | 264/319 |
| 2010/0177455 | A1 | * | 7/2010 | Yoshioka .......... H01L 21/6831 |
| | | | | 361/234 |
| 2014/0071581 | A1 | * | 3/2014 | Haas ................. H01L 21/6833 |
| | | | | 361/234 |

\* cited by examiner

BONDING JIG

CROSS REFERENCE TO RELATED APPLICATIONS

The present application claims priority from Japanese patent application JP 2018-092776 filed on May 14, 2018, the content of which is hereby incorporated by reference into this application.

BACKGROUND

Technical Field

The present disclosure relates to a bonding jig, particularly to the one used for bonding together a gas diffusion layer or a fuel cell constituent member including the gas diffusion layer to be sandwiched between separators and an adhesive sheet for joining the separators and the gas diffusion layer or fuel cell constituent member.

Background Art

Fuel cell devices, which have been widely used because of their effectiveness also in terms of environmental protection, include a stack of a plurality of fuel cells, each fuel cell commonly having a membrane-electrode-gas diffusion layer assembly and a pair of separators sandwiching it. The stack may occasionally have, on its opposite ends in the stacking direction of the fuel cells, dummy cells only including gas diffusion layers without a membrane-electrode assembly (that is, cells that do not generate electricity).

The membrane-electrode-gas diffusion layer assembly includes gas diffusion layers jointed to the respective surfaces on the anode and cathode sides of the membrane-electrode assembly. The membrane-electrode assembly includes an electrolyte membrane and anode and cathode catalyst layers jointed to the opposite surfaces thereof. The electrolyte membrane is made of a proton-conductive solid polymer membrane, while the gas diffusion layers on the anode and cathode sides are each made of a conductive and gas permeable member, such as carbon cloth or carbon paper.

A pair of separators are jointed to the membrane-electrode-gas diffusion layer assembly using an adhesive sheet for such joining such that the adhesive sheet is bonded to a portion near the periphery of one surface of the membrane-electrode-gas diffusion layer assembly. Such an adhesive sheet is also used for joining of separators in producing the aforementioned dummy cell in a similar manner.

Examples of common materials of the gas diffusion layer include carbon cloth and carbon paper. Carbon cloth or carbon paper made of porous carbon fibers is often likely to have a fluffy surface with the fibers. Further, when a large sheet of carbon cloth or carbon paper is cut into pieces in an intended size to be used for a gas diffusion layer in the actual operation, the cut sections on the periphery of each piece become inevitably fluffy with the fibers.

When the gas diffusion layers are stacked on the membrane-electrode assembly, such fluffy fibers may pierce the solid polymer electrolyte membrane through the electrode catalyst layers, possibly causing crossover of a reactant gas across the membrane or a micro short circuit between the electrodes. JP 2016-143468 A describes a technique of avoiding such a state by forming gas diffusion layers using carbon paper free of fluffy fibers, which has been press-fitted between a pair of elastic rolls and thus has eliminated fluffy fibers on the surface of the carbon paper, and then integrating the gas diffusion layers with the solid polymer electrolyte membrane and catalyst layers.

SUMMARY

The method described in JP 2016-143468 A, which can eliminate fluffy fibers on the surface of carbon paper, is expected to realize a gas diffusion layer that does not damage a solid polymer electrolyte membrane. However, when a large sheet of carbon paper is press-fitted between a pair of elastic rolls to be machined, the machined sheet needs to be cut into pieces in an intended size to be used for a gas diffusion layer, and such cutting operation inevitably produces fluffy fibers on the periphery of the resulting gas diffusion layer. Meanwhile, it may also be possible to press-fit each piece of carbon cloth or carbon paper, which has been cut in an intended size, between the pair of elastic rolls to be machined so as to eliminate fluffy fibers on the surface and periphery of the resulting gas diffusion layer. However, performing such machining for each cut gas diffusion layer is burdensome, thus inevitably requiring a longer time for fuel cell production.

The present disclosure has been made in view of the aforementioned circumstances, and realizes a gas diffusion layer cut in an intended size and free of fluffy fibers without requiring a longer time for fuel cell production. More specifically, the present disclosure provides a bonding jig used for bonding a gas diffusion layer or a fuel cell constituent member including the gas diffusion layer to be sandwiched between separators and an adhesive sheet for joining the separators to the gas diffusion layer or fuel cell constituent member, the bonding jig being capable of eliminating fluffy fibers during a bonding process, and thus allowing fast and simplified machining.

The present disclosure provides a bonding jig used for bonding a gas diffusion layer or a fuel cell constituent member including the gas diffusion layer to be sandwiched between separators and an adhesive sheet for joining the separators to the gas diffusion layer or fuel cell constituent member, the bonding jig including a loading area where the gas diffusion layer is loaded when the bonding is performed, the loading area having at least on its periphery a plurality of communication holes communicating with the outside, the communication holes being coupled to a suction device.

In an aspect of the aforementioned bonding jig, the loading area has an appropriate number of grooves, each groove having the communication holes that open on the bottom face thereof.

The use of the bonding jig according to the present disclosure allows elimination of fluffy fibers on the gas diffusion layer during a process of bonding the gas diffusion layer or the fuel cell constituent member including the gas diffusion layer and the adhesive sheet for joining separators to the gas diffusion layer or the fuel cell constituent member, so that the process time can be reduced.

DETAILED DESCRIPTION

Figure 1A:
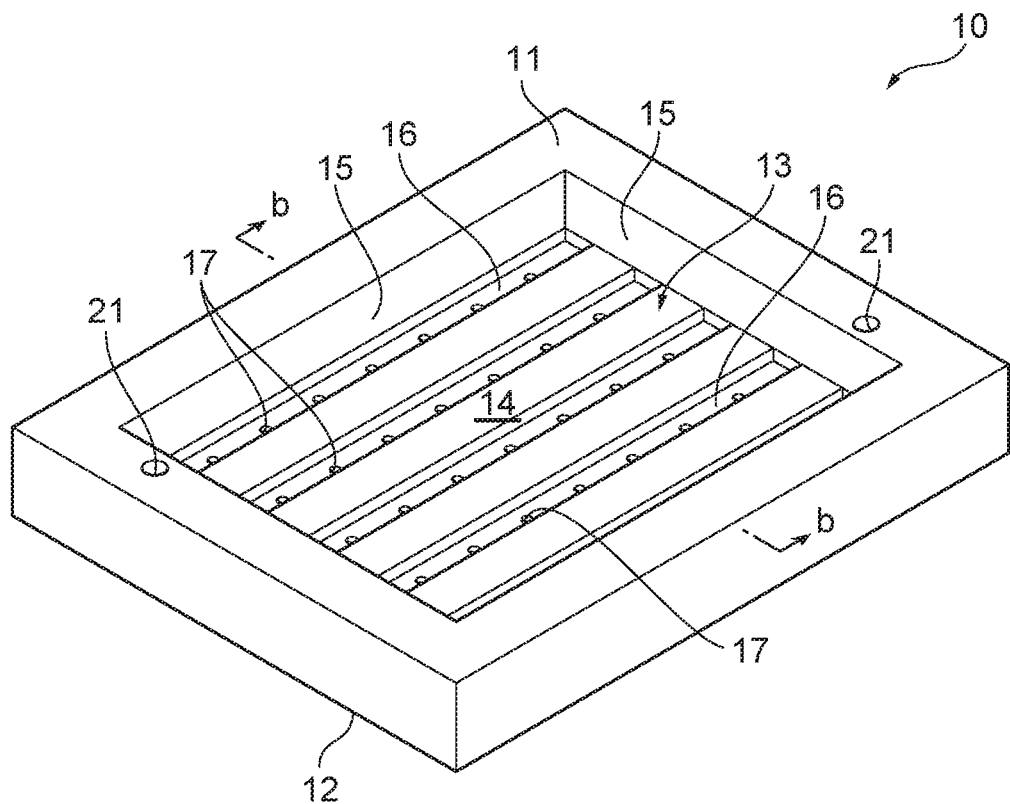
FIGS. 1A and 1B are views for illustration of an embodiment of a bonding jig.
Figure 1B:
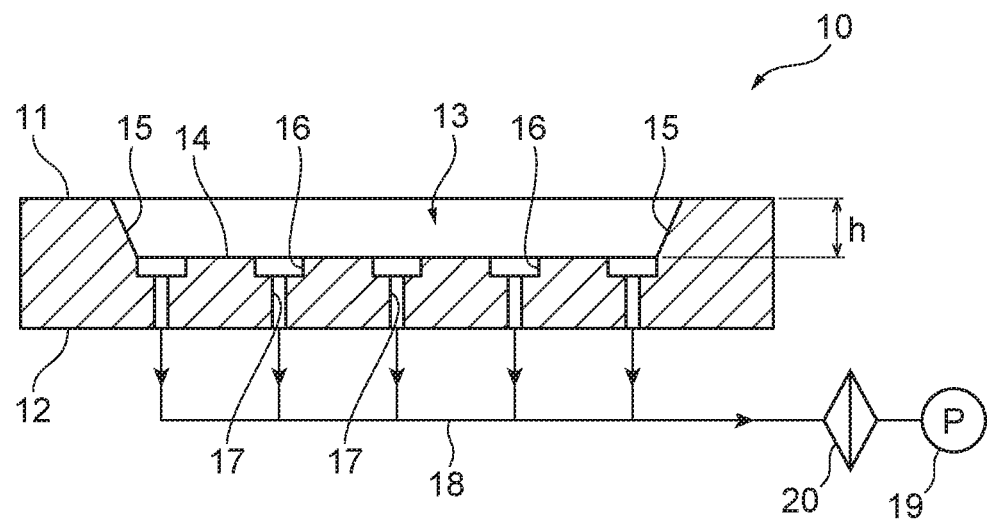

An embodiment of the present disclosure will be described below with reference to the drawings. FIG. 1 show an embodiment of a bonding jig. FIG. 1A is a top perspective view of the bonding jig, and FIG. 1B is a cross-sectional view along line b-b of FIG. 1A.

A bonding jig 10, which is generally in a rectangular shape as seen in plan view, includes an upper face 11 and lower face 12 that are parallel with each other. At least the upper face 11 is flat. A recess 13, which is in a rectangular shape as seen in plan view, is formed such that it is recessed from the upper face 11 toward the lower face 12 with a depth h. The recess 13 has a bottom face 14 that is flat and parallel with the upper face 11. It should be noted that the depth h is substantially the same as the thickness of a gas diffusion layer 30 to be machined, which will be described later. The recess 13 further has a surrounding wall 15, which extends outward, not vertically, so as to widen the opening of the recess 13 from the bottom face 14 toward the upper face 11. The recess 13 corresponds to a "loading area where the gas diffusion layer is loaded in bonding" of the present disclosure. The bonding jig 10 is made of an easy-to-machine material, such as aluminum or resin.

The bottom face 14 has an appropriate number of grooves 16 (five grooves in the embodiment shown in the drawings). Some of the grooves 16 are formed along boundaries between the bottom face 14 and the surrounding wall 15. The grooves 16 are formed along the boundaries on opposing two sides in the embodiment shown herein, but may be formed along the boundaries on all of the four sides. Further, a plurality of grooves 16 extend in parallel with one another in the same direction in the embodiment shown herein, but may be formed such that an appropriate number of the grooves 16 cross one another.

Each groove 16 has on its bottom an appropriate number of through-holes 17 that reach the lower face 12 of the bonding jig 10 and that are coupled to a suction pump 19 via piping 18. The suction pump 19 corresponds to a "suction device" of the present disclosure. The piping 18 has an appropriate filter 20 attached thereto. It should be noted that the grooves 16 may be omitted. In that case, the distal end of each through-hole 17 directly opens on the bottom face of the recess 13, such that the distal end of the through-hole 17 may gradually enlarged to form a funnel shape.

In the embodiment shown in the drawings, an appropriate number of holes 21 for positioning pins are formed on the upper face 11 of the bonding jig 10, though such a configuration is not essential.

An aspect of the usage of the aforementioned bonding jig 10 will be described. It should be noted that the following example illustrates a case where an adhesive sheet is bonded to a gas diffusion layer used for production of a dummy cell without a membrane-electrode assembly. However, the bonding jig 10 may also be used for bonding an adhesive sheet to a gas diffusion layer used for production of a fuel cell with a membrane-electrode-gas diffusion layer assembly.

The suction pump 19 may be actuated to clean the inside of the recess 13 prior to using the bonding jig 10. Such cleaning eliminates, in advance, foreign matter, such as fluffy fibers generated from carbon cloth or carbon paper remaining on the bottom face 14 and inside the grooves 16.

Figure 2A:
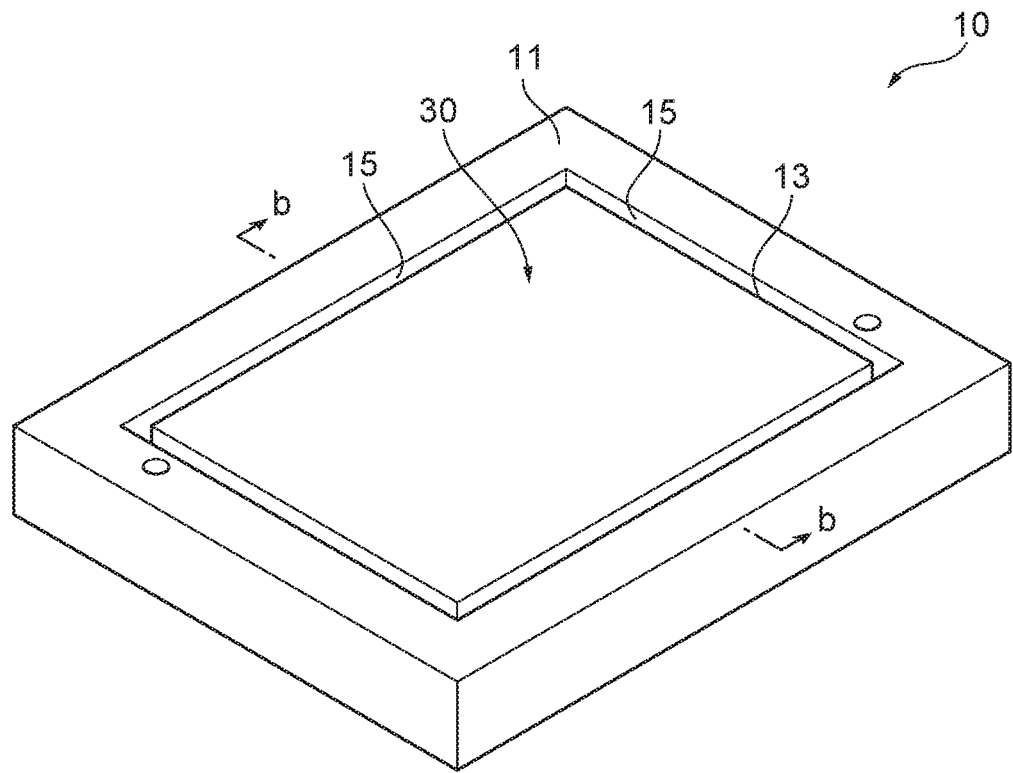
FIGS. 2A and 2B are the first view for illustration of a step for producing, using the bonding jig, a gas diffusion layer integrally formed with an adhesive sheet for joining separators to the gas diffusion layer.
Figure 2B:
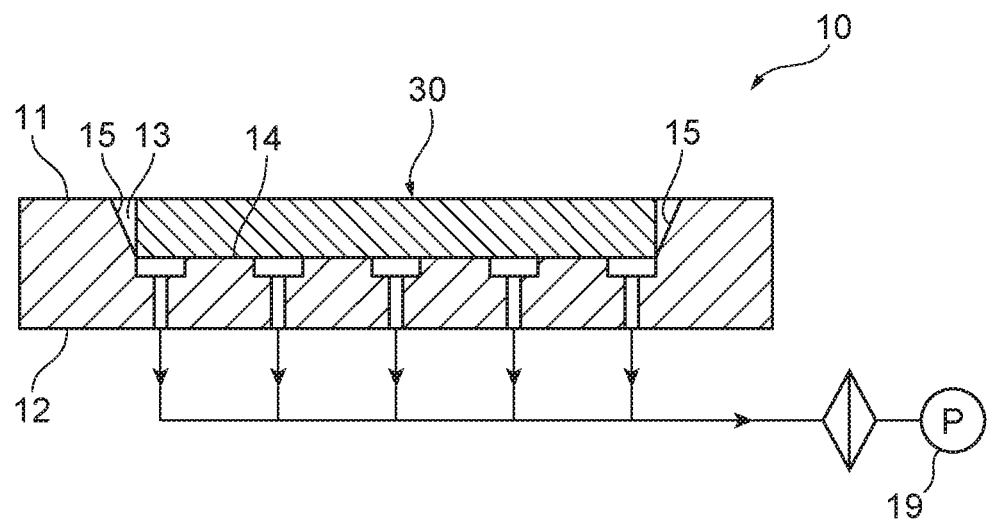

Meanwhile, a large sheet of carbon cloth or carbon paper is cut into pieces in an intended size, to obtain gas diffusion layers 30 in an appropriate size for use in a dummy cell to be produced. Then, each cut gas diffusion layer 30 is placed inside the recess 13 of the bonding jig 10 while the suction pump 19 is suspended. This state is shown in FIG. 2. It should be noted that FIG. 2A is a top perspective view of the bonding jig 10 in such a state, and FIG. 2B is a cross-sectional view along line b-b of FIG. 2A.

The bottom face 14 of the recess 13 is substantially the same in size as each cut gas diffusion layer 30 as shown in the drawings. Each cut gas diffusion layer 30 is fitted into the recess 13 so as to be positioned as well.

Since a gas diffusion layer commonly used for a fuel cell is in a rectangular shape, the recess 13 of the bonding jig 10 of the embodiment shown in FIG. 1 is also in a rectangular shape as seen in plan view. If the gas diffusion layer to be actually used is not in a rectangular shape as seen in plan view, the recess 13, that is, the loading area is formed in a shape corresponding to that of the gas diffusion layer as seen in plan view.

Next, an adhesive sheet 40 to be integrally bonded to the gas diffusion layer 30 is placed on the side of the upper face 11 of the bonding jig 10 with the gas diffusion layer 30 placed in the recess 13. The adhesive sheet 40 is used for joining separators to the gas diffusion layer 30 to produce a dummy cell.

Figure 3A:
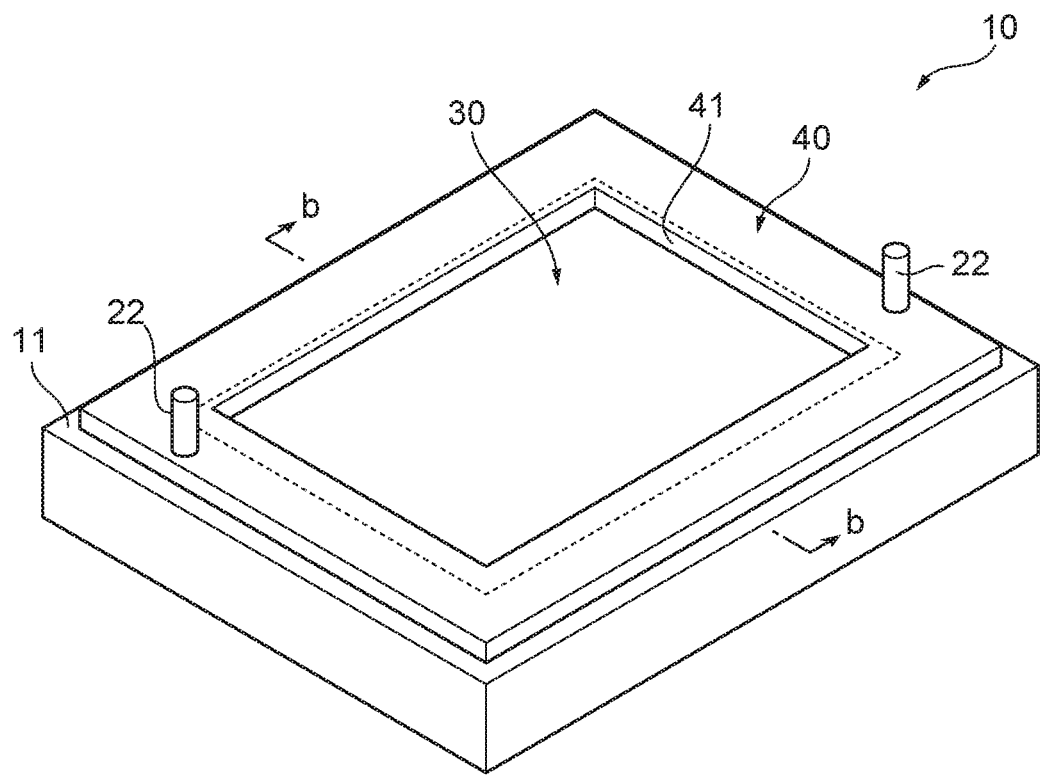
FIGS. 3A and 3B are the second view for illustration of the aforementioned step.
Figure 3B:
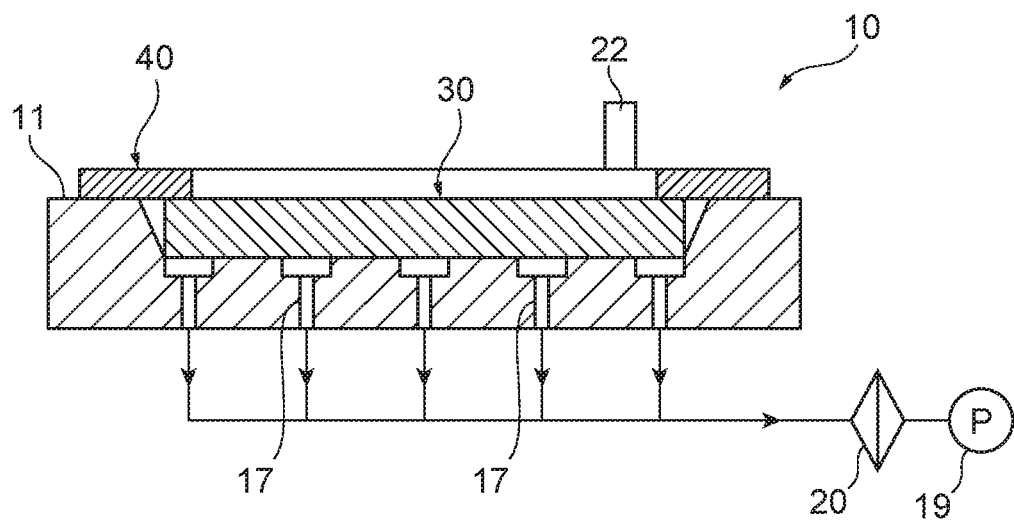

FIG. 3 shows the bonding jig 10 with the adhesive sheet 40 placed on the side of the upper face 11. It should be noted that FIG. 3A is a top perspective view of the bonding jig 10 in such a state, and FIG. 3B is a cross-sectional view along line b-b of FIG. 3A. The adhesive sheet 40 has an opening 41 with a slightly smaller size than that of the gas diffusion layer 30 as seen in plan view. The external size of the adhesive sheet 40 is larger than that of the gas diffusion layer 30 as seen in plan view. The adhesive sheet 40 is positioned with positioning pins 22 inserted into the aforementioned holes 21 for the positioning pins after being placed on the bonding jig 10.

Figure 4A:
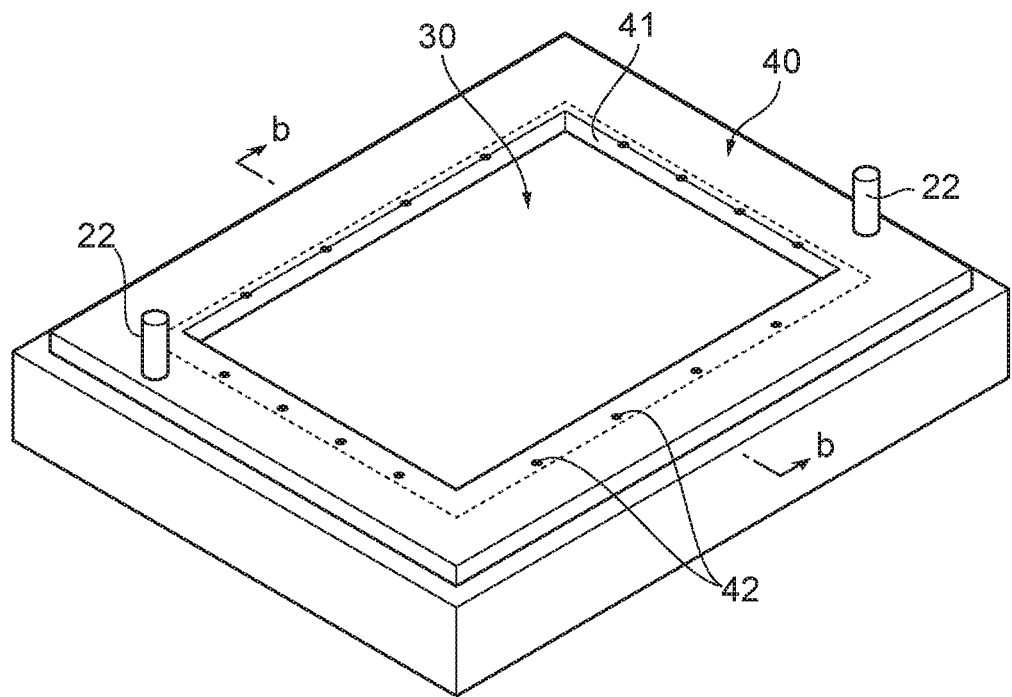
FIGS. 4A and 4B are the third view for illustration of the aforementioned step.
Figure 4B:
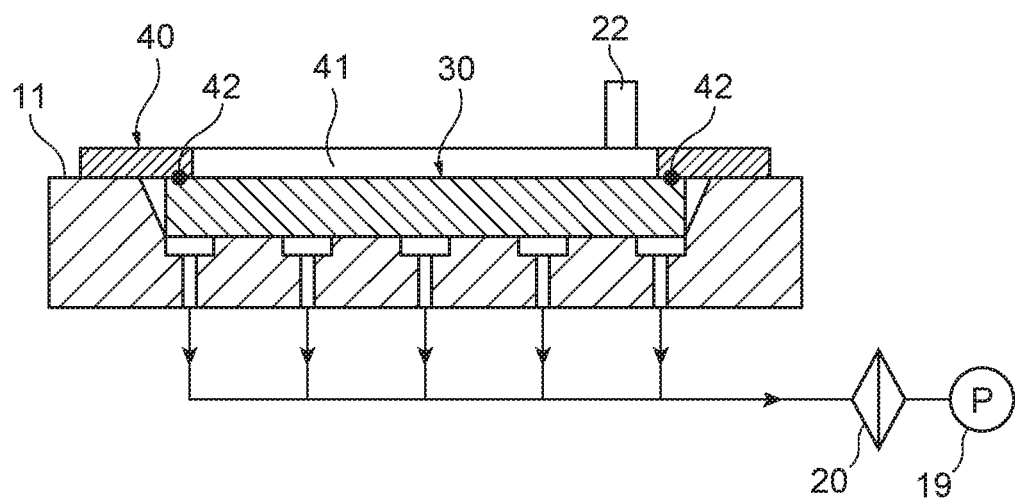

After the bonding jig is set as shown in FIG. 3, the adhesive sheet 40 is integrally welded to the upper side of the gas diffusion layer 30 by an appropriate bonding method, such as ultrasonic welding. Such an integrally welded state is shown in FIG. 4. It should be noted that FIG. 4A is a top perspective view of the bonding jig 10 in such a state, and FIG. 4B is a cross-sectional view along line b-b of FIG. 4A. The bonding may be point bonding as shown in FIG. 4, line bonding, or surface bonding.

During, before, or after the bonding process, the suction pump 19 is actuated, so that air purge proceeds on the contact interfaces between the gas diffusion layer 30 placed inside the recess 13 and each of the bottom face 14 and surrounding wall 15 of the recess 13. With the suction force of the suction pump 19, foreign matter, such as fluffy fibers, on the bottom face and periphery of the gas diffusion layer 30 are sucked into the piping 18, so that the surfaces of the bottom and periphery of the gas diffusion layer 30 become clean surface where no foreign matter is present. The sucked foreign matter, such as fluffy fibers, is eliminated through the filter 20, so as not to adversely affect the performance of the suction pump 19.

Figure 5A:
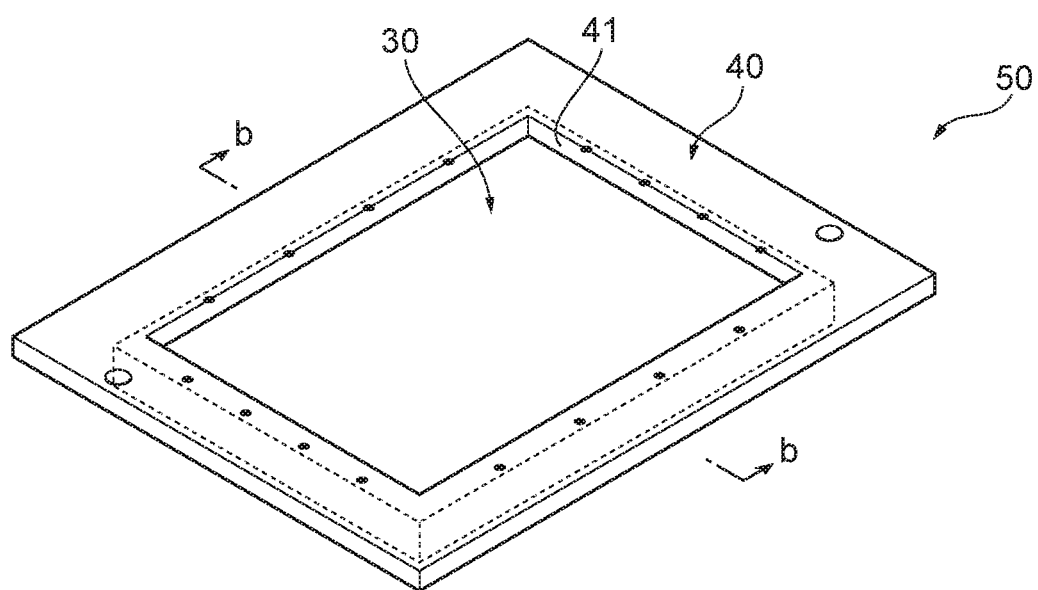
FIGS. 5A and 5B are views for illustration of the produced gas diffusion layer integrally formed with the adhesive sheet.
Figure 5B:
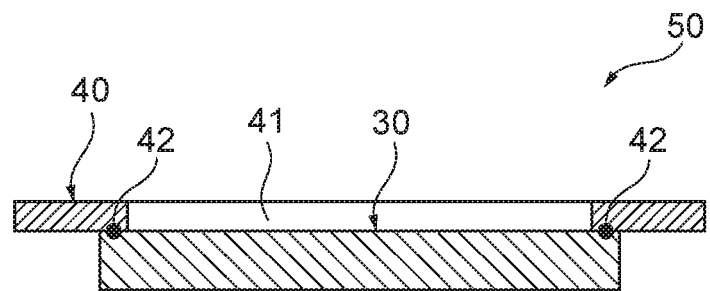

After the sucking process is performed for a required amount of time, the suction pump 19 is stopped, and a bonded object 50 that is an integral structure of the adhesive sheet 40 and gas diffusion layer 30 is removed from the bonding jig 10. As a method for such removal, clean air may be sent into the recess 13 using the piping 18. FIG. 5 show the bonded object 50 removed from the bonding jig 10. FIG. 5A is a top perspective view of the bonded object 50, and FIG. 5B is a cross-sectional view along line b-b of FIG. 5A.

Figure 6:
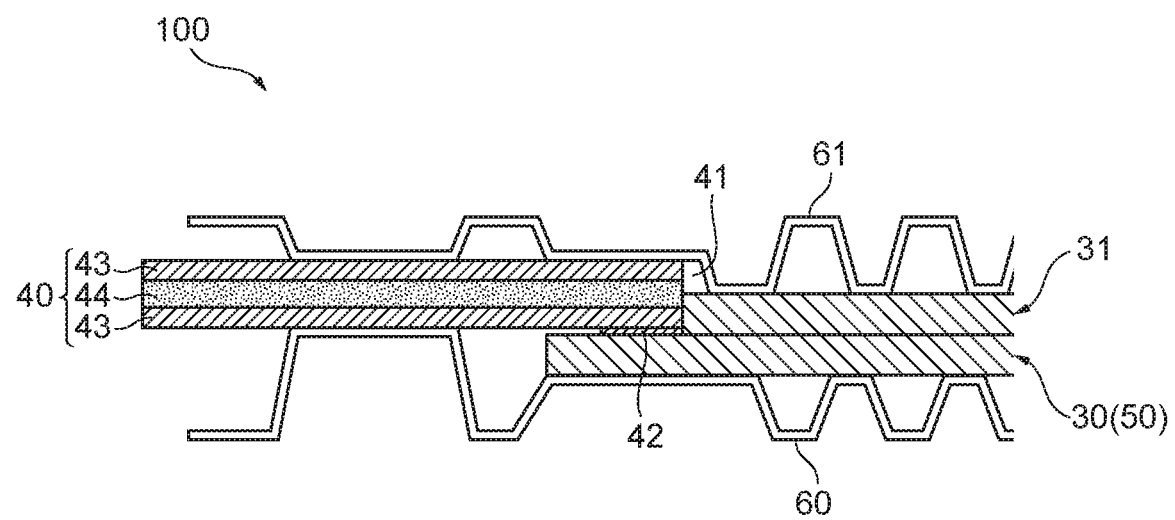
FIG. 6 is a view of an aspect of a dummy cell produced using the gas diffusion layer integrally formed with the adhesive sheet.

FIG. 6 is a cross-sectional view of an aspect of a dummy cell 100 produced using the bonded object 50. The dummy cell 100 is produced such that another gas diffusion layer 31 is placed inside the opening 41 of the adhesive sheet 40 of the bonded object 50 produced as described above so that they are integrally bonded. It should be noted that reference numeral 42 in FIG. 6 denotes a bonded portion. Fluffy fibers on the gas diffusion layer 31 may also be eliminated in advance using an appropriate method. Then, the integral structure of the gas diffusion layer 31 and bonded object 50 is sandwiched between a pair of separators 60 and 61 from its opposite sides, so that the dummy cell 100 is produced. The use of the bonding jig 10 allows the process of bonding the gas diffusion layer 30 and adhesive sheet 40 and the process of eliminating foreign matter, such as fluffy fibers, generated from the gas diffusion layer 30 to be simultaneously performed, thereby improving the process efficiency.

In the present embodiment, examples of materials of the adhesive sheet 40 include polypropylene (PP). Further, the adhesive sheet 40 may be either in a single-layer structure or a stacked structure that includes layers of polypropylene 43 and a biaxially-oriented polyethylene naphthalate (PEN) film 44 sandwiching them, as shown in FIG. 6.

As described above, the bonding jig 10 of the present embodiment may also be used for producing a fuel cell with a membrane-electrode assembly that can generate electricity, instead of producing a dummy cell. In that case, a stack, which includes the gas diffusion layer 30 and a membrane-electrode assembly stacked on one side thereof, is prepared. Then, the stack is placed inside the bonding jig 10 such that the gas diffusion layer 30 faces the bottom face 14 of the recess 13 (or the "loading area") of the bonding jig 10. After the stack is placed inside the bonding jig 10, the adhesive sheet 40 is placed on the stack in the same manner as when the dummy cell is produced, and the stack and adhesive sheet 40 are integrally bonded using an appropriate method. Then, the structure integrally bonded as such is sandwiched between the pair of separators 60 and 61 from its opposite sides, so that the fuel cell is produced.

DESCRIPTION OF SYMBOLS

10 Bonding jig
13 Recess (loading area where gas diffusion layer is loaded)
14 Bottom face of recess
15 Surrounding wall of recess
16 Groove
17 Through-hole
18 Piping
19 Suction pump (suction device)
30 Gas diffusion layer
40 Adhesive sheet (member to be bonded to gas diffusion layer)
41 Opening of adhesive sheet
42 Bonded portion
50 Bonded object that is integral structure of adhesive sheet and gas diffusion layer
60, 61 Separator
100 Dummy cell

What is claimed is:

1. A bonding jig used for bonding a gas diffusion layer or a fuel cell constituent member including the gas diffusion layer to be sandwiched between separators and an adhesive sheet for joining the separators to the gas diffusion layer or the fuel cell constituent member, the bonding jig comprising:
    a recess where the entire gas diffusion layer is placed inside when the bonding is performed, wherein
    the recess, at least on its periphery, has a plurality of communication holes communicating with an outside, the communication holes being coupled to a suction device;
    the recess has a surrounding wall, the surrounding wall extending obliquely outward from a bottom face of the recess toward an upper face of the bonding jig so as to widen the recess; and
    the recess contains grooves, each groove having the communication holes that open on a bottom face of the groove.

2. The bonding jig according to claim 1, wherein the recess contains five grooves.

3. The bonding jig according to claim 1, wherein the recess is rectangular in shape.

4. The bonding jig according to claim 1, wherein the upper face of the bonding jig on which the adhesive sheet is placed is larger than the recess where the entire gas diffusion layer is placed inside when the bonding is performed.

5. The bonding jig according to claim 1, wherein the upper face of the bonding jig comprises holes for receiving positioning pins.

6. A bonding jig used for bonding a gas diffusion layer or a fuel cell constituent member including the gas diffusion layer to be sandwiched between separators and an adhesive sheet for joining the separators to the gas diffusion layer or the fuel cell constituent member, the bonding jig comprising:
    a recess where the entire gas diffusion layer is placed inside when the bonding is performed, wherein
    the recess, at least on its periphery, has a plurality of communication holes communicating with an outside, the communication holes being coupled to a suction device;
    the recess has a surrounding wall, the surrounding wall extending obliquely outward from a bottom face of the recess toward an upper face of the bonding jig so as to widen the recess; and grooves are formed along boundaries on opposing two sides of the recess.

7. A bonding jig used for bonding a gas diffusion layer or a fuel cell constituent member including the gas diffusion layer to be sandwiched between separators and an adhesive sheet for joining the separators to the gas diffusion layer or the fuel cell constituent member, the bonding jig comprising:
    a recess where the entire gas diffusion layer is placed inside when the bonding is performed, wherein
    the recess, at least on its periphery, has a plurality of communication holes communicating with an outside, the communication holes being coupled to a suction device;
    the recess has a surrounding wall, the surrounding wall extending obliquely outward from a bottom face of the recess toward an upper face of the bonding jig so as to widen the recess; and
    grooves are formed along boundaries on four sides of the recess.

8. A bonding jig used for bonding a gas diffusion layer or a fuel cell constituent member including the gas diffusion layer to be sandwiched between separators and an adhesive sheet for joining the separators to the gas diffusion layer or the fuel cell constituent member, the bonding jig comprising:
- a recess where the entire gas diffusion layer is placed inside when the bonding is performed, wherein
- the recess, at least on its periphery, has a plurality of communication holes communicating with an outside, the communication holes being coupled to a suction device;
- the recess has a surrounding wall, the surrounding wall extending obliquely outward from a bottom face of the recess toward an upper face of the bonding jig so as to widen the recess; and
- the bottom face of the recess contains grooves formed along boundaries on the surrounding wall and the bottom face of the recess, each groove having the communication holes that open on a bottom face of the groove.

9. The bonding jig according to claim 8, wherein the surrounding wall intersects the grooves formed along the boundaries.

* * * * *